E. S. DICKEY.
GAS METER.
APPLICATION FILED MAR. 20, 1918.

1,301,041.

Patented Apr. 15, 1919.
4 SHEETS—SHEET 1.

Witness
Floyd R. Cornwall.

Inventor
Edmund S. Dickey,
By Tilian T. Johnson,
Attorney

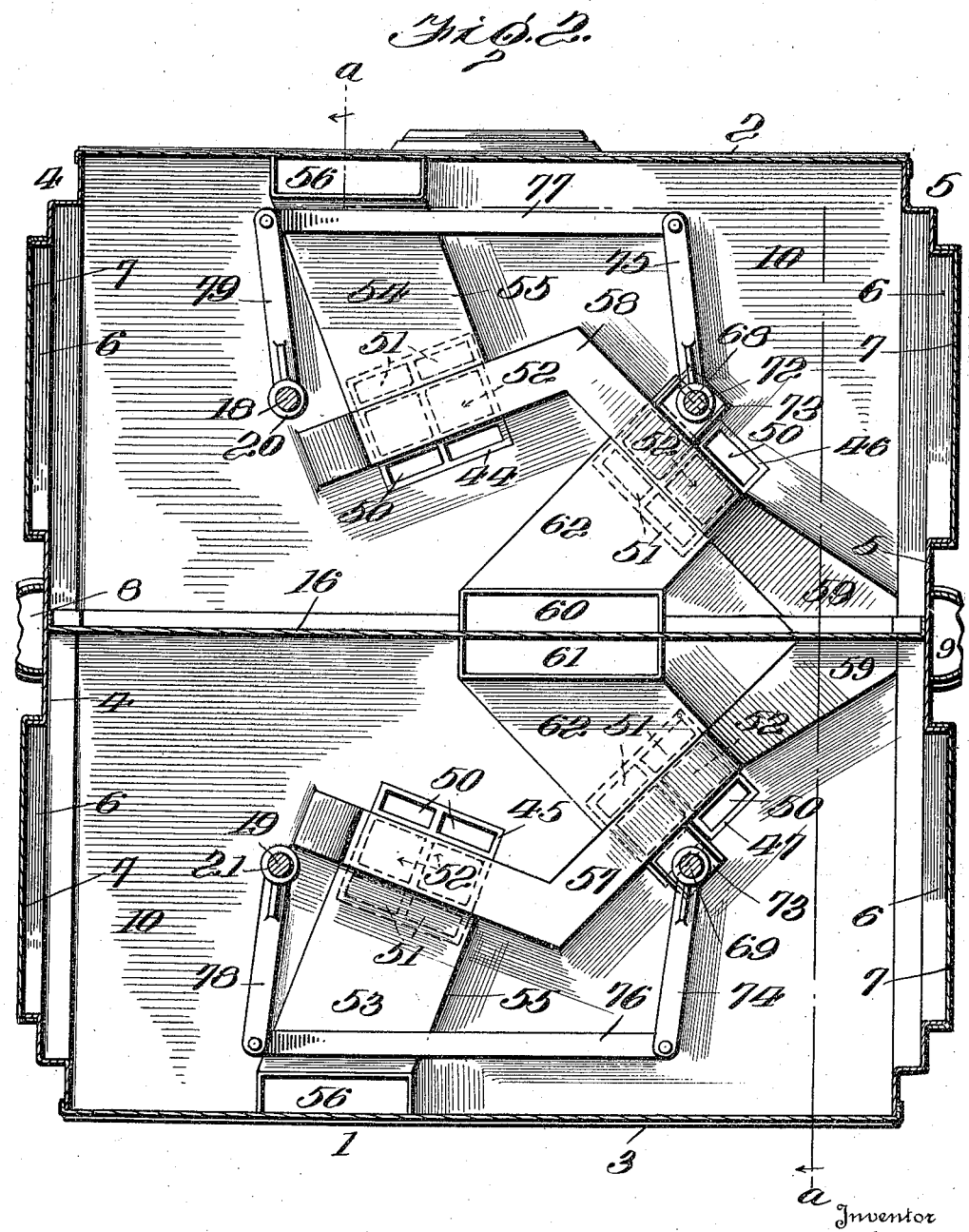

E. S. DICKEY.
GAS METER.
APPLICATION FILED MAR. 20, 1918.
1,301,041.
Patented Apr. 15, 1919.
4 SHEETS—SHEET 3.
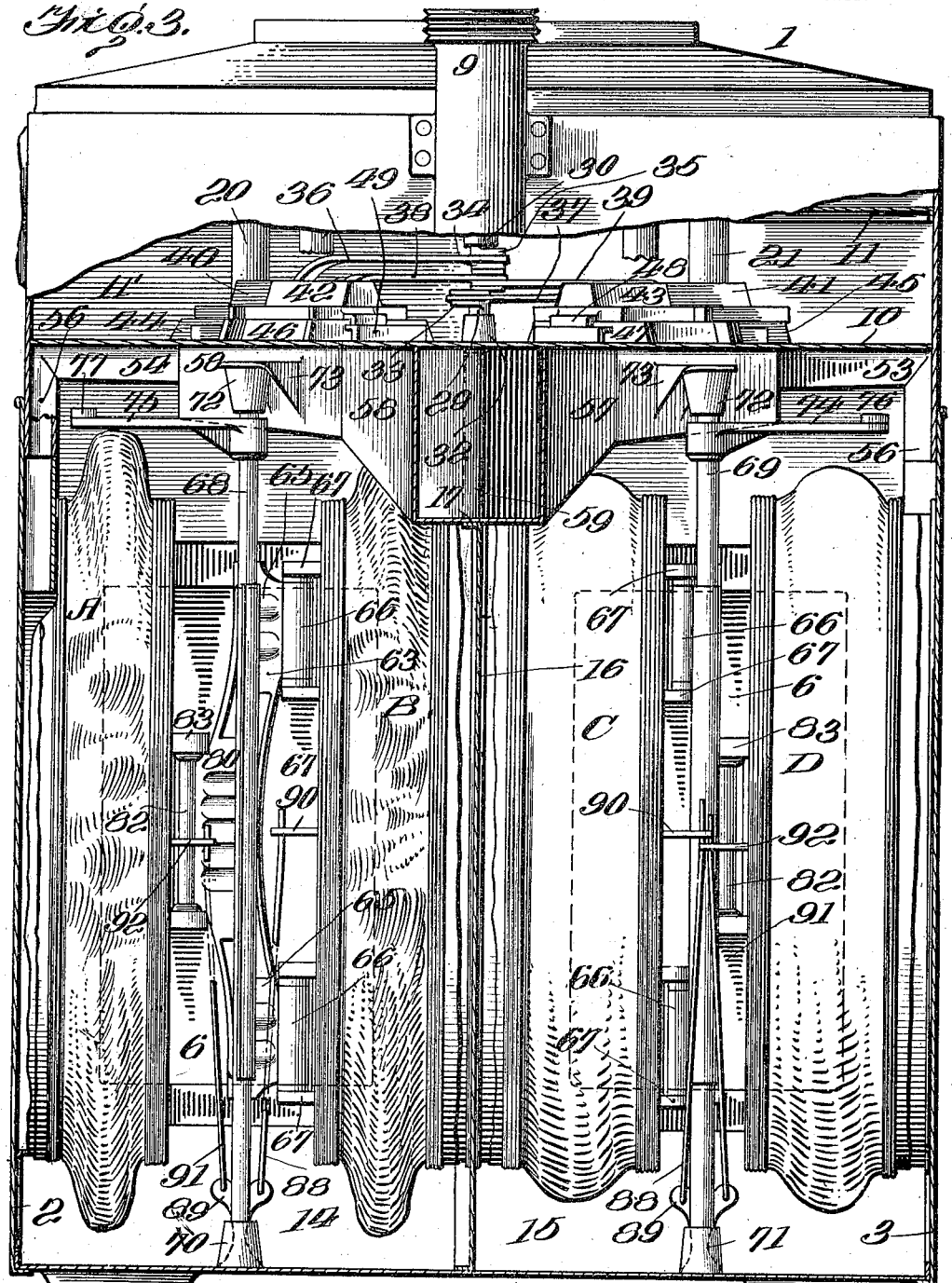

E. S. DICKEY.
GAS METER.
APPLICATION FILED MAR. 20, 1918.
1,301,041.
Patented Apr. 15, 1919.
4 SHEETS—SHEET 4.
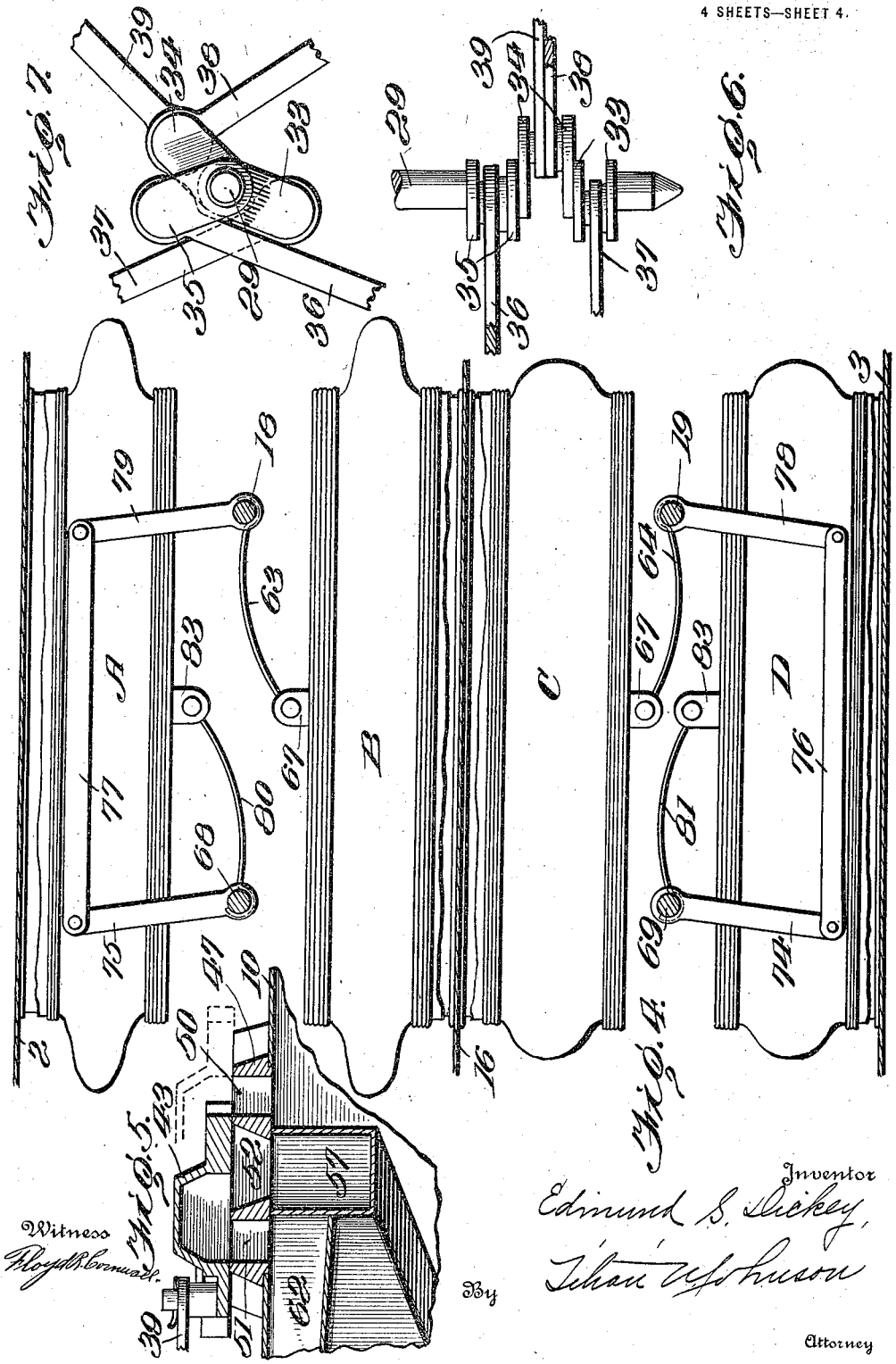

UNITED STATES PATENT OFFICE.

EDMUND S. DICKEY, OF BALTIMORE COUNTY, MARYLAND, ASSIGNOR TO AMERICAN METER COMPANY, INC., OF NEW YORK, N. Y., A CORPORATION OF DELAWARE.

GAS-METER.

1,301,041.  Specification of Letters Patent.  Patented Apr. 15, 1919.

Application filed March 20, 1918. Serial No. 223,575.

*To all whom it may concern:*

Be it known that I, EDMUND S. DICKEY, a citizen of the United States, residing in the county of Baltimore and State of Maryland, have invented certain new and useful Improvements in Gas-Meters, of which the following is a specification.

This invention relates to improvements in dry-type gas meters.

The primary object of the invention is to increase the capacity of the meter without materially increasing its external dimensions and to also, reduce the number of rotations or cycles of the moving parts of the meter, thus effecting a great saving in floor space occupied by the units and increasing the life of the meter, by reason of the absence of lost motion caused by the wear resulting from the rapid rotation of the meter parts.

A further object of the invention is to so construct the meter that pressure absorption, due to the movement of the meter parts, will be reduced to a minimum.

The saving of space in meter installation is recognized to be, under present conditions, extremely important, and with my improvements, I am enabled by increasing the capacity of the meter, without materially increasing its external dimensions, to effect a great saving in this particular. The dimensions of a meter which are of particular importance in connection with the saving of space, are the width and height of the meter, the depth being comparatively unimportant and it is in the direction of the depth that I add somewhat to the external meter dimensions, but in no wise approximating a depth in proportion to the increased capacity of the meter.

The standard thirty light meter of known type, passes approximately 600 cubic feet per hour at $1\frac{6}{10}$ revolutions or cycles of the moving parts per foot. My experiments have demonstrated that I can, with very little increase in the external dimensions of this meter, and that, in the particular of depth, increase its capacity to approximately 1250 cubic feet of gas per hour, with a speed ratio of $\frac{7}{10}$ of one revolution per foot, and without increase in the pressure absorbed in meter operation. In the present day sale of gas for industrial installation, it is not unusual for a single requirement to be as high as 500,000 cubic feet of gas per working day of ten hours, and in some cases even 1,000,000 cubic feet per working day, and occasionally 1,500,000 cubic feet per day. The capacity of the present largest dry type meter is approximately 5,000 cubic feet of gas per hour, with the result that to measure 1,000,000 cubic feet of gas per day, there would be required the installation of approximately 20 individual 5,000 cubic feet meters to meet the requirement. As hereinbefore suggested, the primary objection to large multi-unit installations is the amount of floor space required to accommodate the meters, and the cost of pipe manifold to provide connections for the individual meters is also an objectionable consideration, since practice demonstrates that the cost of installation is about equal to the cost of the meter units.

With the slight changes above suggested as to size in the thirty light meter, I find I can increase the capacity by my improvements, about 105%, and obviously if this result is followed out in all sizes of meter, and there is no reason why it should not be, the number of meter units required in a given installation, would be approximately one half the number of units now necessary, without in any way decreasing pressure by reason of meter absorption, and greatly prolonging the life of the meter by reason of reduction in speed ratio from $1\frac{6}{10}$ revolutions per foot to $\frac{7}{10}$ of one revolution per foot. I accomplish the above by the provision of four diaphragms contained two each in two separate diaphragm compartments, the two diaphragms in each compartment operating simultaneously for full expansion and simultaneously for collapse, by which arrangement three visible volumetric measuring chambers are incident to each diaphragm compartment, that is to say, one measuring chamber inside of each of the two diaphragms, in one diaphragm compartment, and one constituted by the compartment itself, outside of the two diaphragms, or six chambers in all. Now, as a matter of fact, due to the simultaneous movement of the two diaphragms in one diaphragm compartment, I actually obtain in effect, four volumetric measuring chambers in each diaphragm compartment, three of which, in each compartment, are visible, thereby obtaining with each cycle or complete revolution of the meter parts, the equivalent of eight times the volumetric capacity of one single meter diaphragm.

With the above and other objects in view, which will become apparent in the following description, the invention consists in the novel combination and construction and arrangement of parts set forth in the following description.

In the drawings,

Fig. 2 is a cross section taken just below the valve table, looking toward the top of the meter, showing the inlet and outlet channels, and their relation to the valve seats, and the flagstaffs and their connected parts.

Fig. 3 is a side view of the meter, part of the casing being broken away, and parts being in section about on the line a—a of Fig. 2.

Fig. 4 is a diagrammatic top plan view showing the arrangement of the diaphragms in the casing and the manner of connecting each pair for interdependent movement.

Fig. 5 is a cross section about on line b—b of one of the valves.

Fig. 6 is an elevation of the lower part of the valve operating shaft, showing the manner of connecting the valve arms thereto.

Fig. 7 is a plan of the operating shaft with the valve arms broken away.

Figure 1:
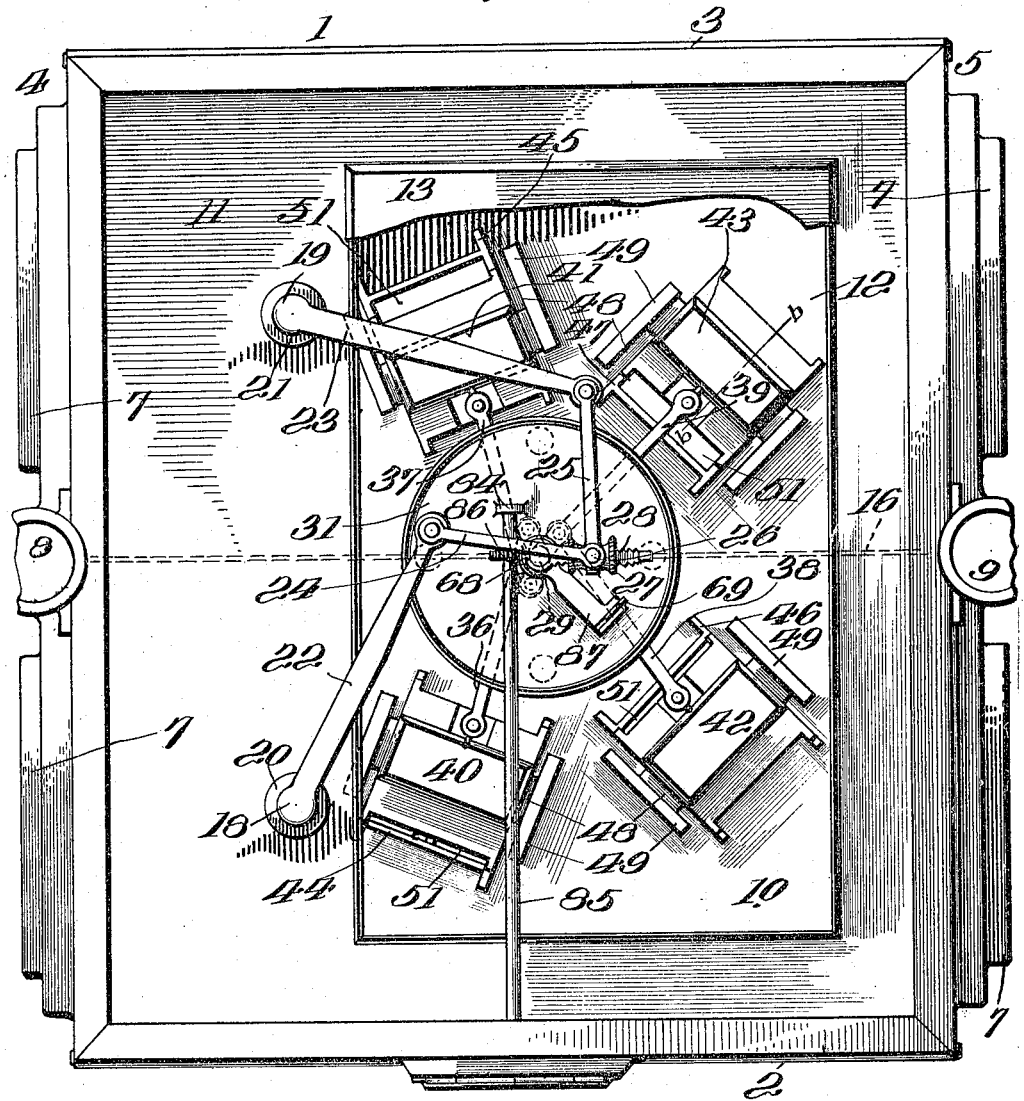
Figure 1 is a top plan view of a meter with the top plate and a portion of a second plate below the top, removed, to show the valves and their connected parts.

Referring to the drawings, the numeral 1 designates the casing, which is like the casing ordinarily used, with the exception that I slightly increase the depth of the meter or increase slightly the external dimension which, as indicated in the preamble, is of secondary importance in meter construction, and installation.

The casing comprises in the main, front plate 2, rear plate 3, side plates 4 and 5, the side plates being provided with openings 6 covered by caps or covers 7, which are soldered to the casing in the usual manner, the openings providing means of access to the internal mechanism. The meter casing is provided with intake opening or manifold 8, and outlet 9. The intake opening communicates with the casing, above the valve table 10, and I provide, above the valve table, a plate 11, peculiar to the present meter construction. This plate, shown clearly in Fig. 1, spans the entire inner cross sectional area of the meter casing, and is cut away to form a rectangular aperture 12 of very considerable size, sufficient to give ready access to the valve table and parts carried thereby, for installation of these valve parts in the first instance, or for their repair. This opening 12 is completely covered and sealed by a cover 13 shown broken away in Fig. 1, which cover is soldered over the opening 12. This plate 11, with the valve table 10, forms an air tight gas chamber 11', in which the valves and valve parts work, this chamber being of sufficient capacity to obtain the desired volume and pressure of gas commensurate with the additional capacity of the meter as a whole.

The numeral 14 designates one diaphragm compartment, and the numeral 15 designates the other, which compartments are formed by the outer walls of the casing and a central, vertical partition 16, which extends from the bottom plate of the meter, to the under side of the valve table 10, the partition being cut away as indicated at 17, for a short distance from the outlet opening for the reception of the lower part of the outlet channels, which cut away portion is soldered to the under face of the outlet channel as shown in Figs. 2 and 3. The compartments formed by the partition contain four diaphragms A, B, C and D.

The numerals 18 and 19 designate the two main flagstaffs. These are stepped in suitable bearings on the bottom of the meter and extend upwardly and through stuffing boxes 20 and 21 secured in the valve table 10, and the plate 11, as shown best in Figs. 1 and 3. These flagstaffs carry respectively at their upper ends flagstaff arms 22 and 23, having pivoted to their free ends links 24 and 25, which links have in turn their other ends provided with eyes which embrace a short stud 26 carried by the adjusting nut 27, which works on the threaded tangent 28 rigidly attached to the upper end of the valve-operating shaft 29. This shaft is passed through a stuffing box 30 integral with a disk 31 which stuffing box forms a bearing for the upper part of the shaft, and the lower end of the shaft is stepped in a bearing 32, rigidly supported on the valve table 10. The shaft is provided with three cranks 33, 34, 35 to which are pivotally connected the valve arms 36, 37, 38 and 39, which arms are in turn pivotally connected with reciprocating valves 40, 41, 42, and 43, which slide upon valve seats 44, 45, 46 and 47 which seats are fitted into recesses in the valve table 10, and soldered or otherwise firmly secured thereto. Each valve is provided with oppositely disposed laterally extending ledges 48, which extend under guide ways 49 parallel with the valve seats on each side thereof, so as to properly and accurately guide the valves in their reciprocation.

The valve arm 36 of valve 40 is connected with the crank 35 and the valve arm 37 of valve 41 is connected with crank 33, while both of the valve arms 38 and 39, of valves 42 and 43, are connected with the remaining crank 34, and the angulation of the cranks with regard to the axis of the operating shaft is such that two valves will operate slightly in advance of the other two. The valve seats are provided with casing ports 50, diaphragm ports 51, and outlet ports 52, that is to say, ports which lead to the diaphragms, ports that lead to the compartments in which the diaphragms are located and ports which lead from the diaphragms and their compartments to the suitable outlet channels, through the valves.

The numerals 53 and 54 designate two diaphragm channels located at the front and rear of the meter casing, and which are formed by angular metal troughs soldered to the under side of the valve table 10, and to the front and rear of the meter. These channels are each formed with a reach or horizontal portion 55 and with a vertical reach 56, communicating with the two outer diaphragms A and D, and the inner ends of the reaches 55, envelop the diaphragm ports 51 of valve seats 44 and 45. The numerals 57 and 58 designate two outlet channels into which the outlet ports 52 of all of the valves enter, and these two channels are brought together at one side of the meter, as indicated at 59 and communicate with the outlet 9, all of which is clearly shown in Fig. 2 of the drawings.

The numerals 60 and 61 (Fig. 2) designate two channels which connect with the two inner diaphragms B and C. These channels are angular in form with the vertical portions soldered to the central partition 16, having gas-tight connection with the diaphragms, and these channels are, like the other diaphragm channels, each provided with a horizontal reach 62, which envelops the diaphragm ports 51 of valve seats 46 and 47.

The main flagstaffs 18 and 19 carry flags 63 and 64, rigidly connected with the flagstaffs, but pivotally connected with the diaphragms B and C, the connection being at two points on each diaphragm plate, thus serving as not only a connection between the staff and the diaphragm which permits the diaphragm to expand and collapse, but also serves to support the diaphragm in true vertical position. This connection is constituted by forming the flag with two separate arms 65, which carry integral sleeves 66, for reception between the ears 67 on the diaphragm plate, there being a pin extending through the sleeves and ears forming the pivotal connection. The numerals 68 and 69 designate two supplemental flagstaffs stepped at their lower ends in bearings 70 and 71 in the bottom of the casing, and at their upper ends having bearings in steps 72 carried by brackets 73, soldered to the sides of the channels 57 and 58, the mounting being such that the shafts can oscillate freely. The numerals 74 and 75 designate arms keyed to the supplemental shafts and these arms in turn have pivotally connected with their free ends, arms 76 and 77, which, in turn, are connected pivotally at their opposite ends to two arms 78 and 79, carried by the main flagstaffs 18 and 19 below the valve table, as shown in Figs. 2 and 4, thus connecting the main and supplemental flagstaffs so that they oscillate together when oscillatory movement is imparted to the main flagstaffs 18 and 19, through the mechanism above the valve table. The supplemental flagstaffs are each provided with a flag designated by the numerals 80 and 81, the flags carried by these staffs being formed with a single arm, carrying a sleeve 82 which is received between ears 83 carried by the inner plate of each outer diaphragm, as shown in Figs. 3 and 4. These ears and sleeves are connected by pins forming suitable pivotal connection between the flags and the diaphragms. As the diaphragms expand, the flags move inwardly, the single arm of one flag working in between two arms of the adjoining flag, thus in no way interfering with the full expansion of the diaphragms.

The diaphragms in each compartment are designed to work in unison in pairs, that is to say, two in one compartment will be collapsing, or will be in the act of being collapsed by the pressure of the gas in their compartment while the two in the adjoining compartment will be expanding, forcing the gas out of their compartment. The angulations of the cranks on the valve operating shaft are such that the movements of the valves will be so timed that two diaphragms in one compartment will be empty, when the other two diaphragms in the next compartment will be filling, and vice versa, with the result that such ports are in registry as to permit the gas to pass out of the diaphragm channels of one set of diaphragms, while it is entering the diaphragm channels of the other set, and other movements of the valves will permit the passage of gas out of the diaphragm compartments of one set upon the expansion of the diaphragms in that compartment, and so on successively, there being, however, an overlapping of the valve strokes, so that at no time, is there a cessation of movement of the diaphragms and connected parts. In other words, the filling and emptying operations for the diaphragms and their compartments, is continuous and uniform and the angulations of the cranks on the shafts and their connections with the valves, are such that dead center is impossible.

I am reverting to the disk 31. This disk is of substantial construction and is supported upon the valve table 10 by means of a plurality of posts. It carries a bearing 84 for the dial shaft 85, which carries a gear 86, in mesh with a worm on the crank shaft, whereby the cycles or revolutions of the valve operating shaft are communicated to the dial mechanism. The dial mechanism, worm and gear, are of usual construction, but the manner of mounting and supporting the dial shaft is peculiar to this meter construction. This disk also carries an angle arm 87, rigidly secured at its lower end to the disk, and its horizontal portion is provided with an eye 68 which embraces the operating shaft, thus serving as an additional bearing and steadying means for the upper part of the shaft. The arm also carries a pawl 69 capable of a swinging movement in one direction, and adapted to be engaged by the tangent in the revolution of the meter parts and to permit the continued movement of the tangent in one direction or the right direction, and prevent a retrograde or undesirable movement of the tangent.

In operation, gas passes from the chamber 11′ into a set of diaphragms, or into the compartment of a set of diaphragms, according to the position of the valve. After the meter has gotten in full operation, the gas will be emptying from one diaphragm compartment as the diaphragms therein are expanded. Under these conditions, the positions of the valves will be such that the casing ports will be closed against further admission of gas through the casing ports, but communication will be established between the casing ports through the valves to the outlet channels. Meanwhile, the valves controlling the inflow and outflow of gas to and from the diaphragms of the other set and their compartments, will be in such position as to establish communication between the diaphragms and the outlet ports through the valves and at the same time establish communication between the chamber 11′ and the diaphragm compartment, the pressure of the incoming gas collapsing the diaphragms and forcing the gas out of them, it being understood that when communication is established between the intake and the diaphragm compartments, the pressure in the compartments is greater than in the diaphragms, consequently, collapsing the diaphragms, and that when said communication is cut off, the diaphragms can again freely expand under the influence of the gas passing into them, this, as usual in meters of this character, bringing about, through flagstaffs and valve operating shaft, the requisite movement of the valves, during the cycles of the meter fittings.

The numeral 88 designates two guide wires, bent in the form of a yoke. These wires are supported in bearings 89 at the bottom of the casing and extend upwardly where their upper ends extend through apertures in ears 90 soldered to the outer plates of the two inner diaphragms. The numeral 91 designates two similar wires also mounted in the bearings 89 and their upper ends extend through apertures in ears 92 on the inner faces of the two outer diaphragms. There are two ears on each diaphragm, oppositely disposed, all adapted to receive the upturned ends of the guide wires. These yoke-shaped guide wires rock back and forth through their apertures as the diaphragms expand and collapse. The ears 92 are mounted upon the diaphragm plates at a lower point than the ears 90, and slightly farther from the center of the diaphragms, so that the guide wires and the ears will not interfere in any way when the diaphragms move toward each other.

Having thus fully described my invention, what I claim is:

1. In a gas meter, in combination, a suitable casing having separate gas-tight compartments and intake and outlet openings, two sets of diaphragms each set located in a separate compartment, a plurality of valves controlling the flow of gas into and out of one set of diaphragms and its compartment, and a plurality of valves controlling the flow of gas into and out of the other set of diaphragms and its compartment.

2. In a gas meter, in combination, a suitable casing having inlet and outlet openings and divided into two diaphragm compartments, two diaphragms in each compartment, four valves controlling the flow of gas into and out of the diaphragms and their compartments, two for each two diaphragms and their compartments.

3. In a gas meter, in combination, a suitable casing having separate compartments therein, and intake and outlet openings, two pairs of diaphragms, each pair located in separate compartments, valves for controlling the flow of gas to and from each pair of diaphragms and its compartment, a valve operating shaft having three cranks, two of the valves being connected with one crank and the other two valves connected with the other two cranks respectively, connections between a diaphragm in each compartment and the valve operating shaft, whereby the valves are operated upon the expansion and collapse of the diaphragms.

4. In a gas meter, in combination, a suitable casing having separate compartments therein, and inlet and outlet ports, two pairs of separated diaphragms located in separate compartments in the casing, valves for controlling the flow of gas into and out of the diaphragms and their compartments, connections between two of the diaphragms and the valves, for operating the valves, and connections between the two first mentioned diaphragms and the two other diaphragms, whereby the simultaneous expanding and simultaneous collapsing of each pair of diaphragms in each compartment will be in unison.

5. In a gas meter, in combination, a suitable casing having inlet and outlet openings therein, and a plurality of sets of separated diaphragms in the casing, valves for controlling the flow of gas into and out of the diaphragms and the casing, a valve shaft having connections with the valves, connections between the valve operating shaft and two of the diaphragms, and connections between the two diaphragms and the remaining diaphragms, whereby a plurality of the diaphragms will expand and collapse in unison.

6. In a gas meter, in combination, a suitable casing having separate compartments therein, and intake and outlet openings, two sets of diaphragms in separate compartments in the casing, a flagstaff in each compartment and having connection with one of the diaphragms, and a supplemental flagstaff in each compartment connected with the other diaphragm, and connections between the flagstaffs whereby they will be caused to oscillate together.

7. In a gas meter, in combination, a suitable casing having separate compartments therein, and intake and outlet openings, two sets of diaphragms in separate compartments in the casing, a flagstaff in each compartment and operatively connected with one diaphragm, a supplemental flagstaff in each compartment connected with the other diaphragm, connections between the two flagstaffs in each compartment, whereby they oscillate together, a valve operating shaft and connections between the valve operating shaft and two of the flagstaffs, valves for controlling the flow of gas into and out of the diaphragms and casing, and connections between the valves and the operating shafts, whereby when the flagstaffs are oscillated, the valves will be operated.

8. In a gas meter, in combination, a suitable casing having separate compartments therein, and intake and outlet openings, two pairs of diaphragms, each pair located in a separate compartment in the casing, a valve table above the diaphragms, and having two valve seats for each compartment, the seats being provided with casing, diaphragm, and outlet ports, valves for controlling the flow of gas into and out of the diaphragms and their compartments, two channels common to all of the outlet ports, and four channels to the diaphragm ports in the four valve seats.

9. In a gas meter, in combination, a plurality of diaphragms arranged in sets of two, a flagstaff having connection with a diaphragm of a set and a supplemental flagstaff having connection with the other diaphragm of a set, and connections between the main and supplemental flagstaffs, whereby they oscillate together.

10. In a gas meter, in combination, a suitable casing having separate compartments therein, two sets of diaphragms in separate compartments in the casing, a flagstaff in each compartment and having connection with one of the diaphragms and a supplemental flagstaff in each compartment connected with the other diaphragm, and connections between the flagstaffs, whereby they will be caused to oscillate together.

11. In a gas meter, in combination, a suitable casing having separate compartments therein, two sets of diaphragms in separate compartments in the casing, a flagstaff in each compartment, and having connection with one of the diaphragms, and a supplemental flagstaff in each compartment connected with the other diaphragm, connections between the flagstaffs whereby they will be caused to oscillate together, and thereby cause the two diaphragms in one compartment to simultaneously expand fully in unison, or to simultaneously collapse completely in unison.

In testimony whereof I affix my signature in presence of two witnesses.

EDMUND S. DICKEY.

Witnesses:
 FRANK G. BRERETON,
 TITIAN W. JOHNSON.

Copies of this patent may be obtained for five cents each, by addressing the "Commissioner of Patents, Washington, D. C."